United States Patent [19]

Shinonaga et al.

[11] Patent Number: 5,585,187
[45] Date of Patent: *Dec. 17, 1996

[54] METHODS FOR SURFACE TREATING AND PAINT-COATING RESIN COMPOSITION MOLDED ARTICLES AND PAINT-COATED ARTICLE OBTAINED BY SAID METHOD FOR PAINT-COATING

[75] Inventors: Hideo Shinonaga, Chiba; Satoru Sogabe, Sodegaura, both of Japan

[73] Assignee: Sumitomo Chemical Company, Limited, Osaka, Japan

[*] Notice: The term of this patent shall not extend beyond the expiration date of Pat. No. 5,462,987.

[21] Appl. No.: 440,059

[22] Filed: May 12, 1995

[30] Foreign Application Priority Data

May 23, 1994 [JP] Japan ..................... 6-108184

[51] Int. Cl.$^6$ ..................... B32B 9/00
[52] U.S. Cl. .................. 428/424.8; 428/31; 428/297; 428/324; 428/423.5; 428/462; 428/523; 525/71; 525/78; 525/88; 525/89; 524/406; 524/418; 524/423; 524/427; 524/451; 427/307; 427/322; 427/393.5; 427/519
[58] Field of Search ............... 428/31, 523, 324, 428/462, 500, 424.8, 423.7; 525/71, 78, 88, 89, 240, 504; 524/406, 418, 423, 427, 451, 432, 437, 442, 445, 447, 448, 449, 452, 504

[56] References Cited

U.S. PATENT DOCUMENTS

| | | | |
|---|---|---|---|
| 5,077,082 | 12/1991 | Katoh et al. | 427/54.1 |
| 5,132,131 | 7/1992 | Katoh et al. | 427/54.1 |
| 5,185,188 | 2/1993 | Abe et al. | 427/533 |
| 5,200,122 | 4/1993 | Katoh et al. | 264/22 |
| 5,273,789 | 12/1993 | Shinonaga et al. | 427/558 |
| 5,276,093 | 1/1994 | Kitagawa et al. | 525/89 |
| 5,296,273 | 3/1994 | Abe et al. | 427/553 |
| 5,462,987 | 10/1995 | Shinonaga et al. | 524/451 |

FOREIGN PATENT DOCUMENTS

| | | |
|---|---|---|
| 0537368 | 4/1993 | European Pat. Off. . |
| 0601559 | 6/1994 | European Pat. Off. . |

*Primary Examiner*—Patrick Ryan
*Assistant Examiner*—Abraham Bahta
*Attorney, Agent, or Firm*—Sughrue, Mion, Zinn, Macpeak & Seas

[57] ABSTRACT

The present invention relates to;

a method for surface treating a polypropylene resin composition molded article, which comprises irradiating a molded article with ultraviolet light having an irradiation wavelength of 300 nm or less, said molded article being obtained from a polypropylene resin composition which comprises:

(A) 15–92% by weight of a crystalline propylene-ethylene block copolymer resin,
(B) 5–40% by weight of an ethylene-propylene copolymer rubber,
(C) 1–15% by weight of a hydroxyl group-containing propylene oligomer, and
(D) 2–30% by weight of an inorganic filler;

a method for paint-coating a polypropylene resin composition molded article, which comprises irradiating a molded article with ultraviolet light having an irradiation wavelength of 300 nm or less and coating the irradiated surface with a paint, said molded article being obtained from a polypropylene resin composition which comprises said components (A), (B), (C) and (D) above-mentioned; and a paint-coated article obtained by said method for paint-coating the polypropylene resin composition molded article.

According to the present invention, the methods for surface treating and paint-coating the polypropylene resin composition molded article, which gives excellent paint-coatability and adhesion property of said molded article, and the paint-coated article, which is useful and suited especially for automotive exterior parts such as a bumper and an instrument panel, obtained by said method for paint-coating may be provided.

20 Claims, No Drawings

METHODS FOR SURFACE TREATING AND PAINT-COATING RESIN COMPOSITION MOLDED ARTICLES AND PAINT-COATED ARTICLE OBTAINED BY SAID METHOD FOR PAINT-COATING

FIELD OF THE INVENTION

The present invention relates to methods for surface treating and paint-coating polypropylene resin composition molded articles.

It further relates to a paint-coated article of a polypropylene resin composition, which is obtained by said method for paint-coating and useful and suited especially for automotive exterior parts such as a bumper and an instrument panel.

BACKGROUND OF THE INVENTION

A polypropylene resin composition has been known to be difficult to be paint-coated, printed and bound due to their non-polarity. Therefore, there has been proposed an improved method for paint-coating the molded article of a polypropylene resin composition. For example, so-called a primer or an under-coating is usually applied as a inter-layer between the polypropylene resin composition and the paint-coated layer to improve their compatibility. This method is, however, still unsatisfactory from the industrial view point because a primer itself is expensive, an additional step required to apply a primer increases the cost of the final product, and a primer causes an environmental problem associated with its waste treatment.

Furthermore, the application of a primer is usually performed by cleaning with vapor of halogenated hydrocarbon such as 1,1,1-trichloroethane. But, the use of the halogenated hydrocarbon is now being banned in consideration of the ozone layer depletion or the protection of the global environment.

The another method for improvement of the surface treatment of the molded articles of a polypropylene composition is proposed to increase the bonding strength of paints, prints or adhesives to them.

For example, sandblasting, chromic acid treatment, flame treatment, corona discharge treatment, plasma treatment, surface activation with functional groups, and photo-induced surface grafting are applied before paint-coating the molded article. However, none of them is satisfactory from the standpoint of performance and environmental problem.

Under these circumstances, the present inventors conducted a series of researches with respect to the methods for surface treating and paint-coating a polypropylene resin composition molded article, which led to the finding that the surface property of the molded article is greatly improved when the surface of a specified polypropylene resin composition molded article is irradiated with ultraviolet light having a specified irradiation wavelength, and attained the present invention.

SUMMARY OF THE INVENTION

Accordingly, an object of the present invention is to provide a method for surface treating a polypropylene resin composition molded article, which comprises irradiating a molded article with ultraviolet light having an irradiation wavelength of 300 nm or less, said molded article being obtained from a polypropylene resin composition which comprises:

(A) 15–92% by weight of a crystalline propylene-ethylene block copolymer resin,
(B) 5–40% by weight of an ethylene-propylene copolymer rubber,
(C) 1–15% by weight of a hydroxyl group-containing propylene oligomer, and
(D) 2–30% by weight of an inorganic filler.

Another object of the present invention is to provide a method for paint-coating a polypropylene resin composition molded article, which comprises irradiating a molded article with ultraviolet light having an irradiation wavelength of 300 nm or less and coating the irradiated surface with a paint, said molded article being obtained from a polypropylene resin composition which comprises:

(A) 15–92% by weight of a crystalline propylene-ethylene block copolymer resin,
(B) 5–40% by weight of an ethylene-propylene copolymer rubber,
(C) 1–15% by weight of a hydroxyl group-containing propylene oligomer, and
(D) 2–30% by weight of an inorganic filler.

Further, the object of the present invention is to provide a paint-coated article obtained by a method for paint-coating a polypropylene resin composition molded article, which comprises irradiating a molded article with ultraviolet light having an irradiation wavelength of 300 nm or less and coating the irradiated surface with a paint, said molded article being obtained from a polypropylene resin composition which comprises:

(A) 15–92% by weight of a crystalline propylene-ethylene block copolymer resin,
(B) 5–40% by weight of an ethylene-propylene copolymer rubber,
(C) 1–15% by weight of a hydroxyl group-containing propylene oligomer, and
(D) 2–30% by weight of an inorganic filler.

DETAILED DESCRIPTION OF THE INVENTION (A) The crystalline propylene-ethylene block copolymer resin:

As the crystalline propylene-ethylene block copolymer resin (A) of the present invention, the following propylene-ethylene block copolymer resin is preferable; namely, the propylene-ethylene block copolymer resin, containing 5 to 20% by weight, more preferably 7 to 15% by weight, of an ethylene-propylene random copolymer unit (A1) having ethylene/propylene ratio of 20/80 to 60/40, more preferably 20/80 to 50/50, and a crystalline propylene homopolymer unit (A2) having an intrinsic viscosity $[\eta]_P$ measured with tetralin solution at 135° C. of 0.8 to 2.0 dl/g, the Q value (weight average molecular weight Mw/number average molecular weight MN) measured by GPC of 3.0 to 5.0 and the content of xylene-soluble portion at 20° C. of 1.5% by weight or less, more preferably 1.2% by weight or less.

The crystalline propylene-ethylene block copolymer resin used in the present invention can be obtained by conventional methods, for example, by a 2-stage method of polymerizing propylene on 1st stage and a mixture of propylene and ethylene on 2nd stage in the presence of a Ziegler-Natta catalyst, which is composed of titanium trichloride and alkyl aluminum compound.

As the catalyst used in the present invention, the catalyst comprising a complex of titanium trichloride with magnesium, trialkyl aluminum compound and an electron donative organic compound is preferable. The method for preparing said catalyst is described in detail, for example, in the Japanese Unexamined Patent Publication No. Sho 61/218606.

The amount of the crystalline propylene-ethylene block copolymer resin in the polypropylene resin composition used in the present invention is 15 to 92% by weight, preferably 25 to 85% by weight. When said amount is less than 15% by weight, it causes the decreases of the appearance, especially by generating flow mark, the stiffness and the heat resistance of the resulting molded article. When said amount is more than 92% by weight, it causes the decreases of the impact strength at low temperature and the adhesion of paint-coated layer.

(B) The ethylene-propylene copolymer rubber:

As the ethylene-propylene copolymer rubber (B) used in the present invention, ethylene-propylene random copolymer rubber composed of ethylene and propylene or ethylene, propylene and non-conjugated diene, which contains 20–75% by weight of propylene and which has a Mooney viscosity ($ML_{1+4}$ 100° C.) of 10 to 100, is preferable, and the Mooney viscosity of 20 to 85 is more preferable. When the ethylene-propylene copolymer rubber copolymerized small amount of non-conjugated diene is used, its iodine value of 20 or less is preferable.

With a propylene content outside the above-specified range, the resulting molded article has relatively poor impact strength.

With a Mooney viscosity lower than 10, the resulting molded article has relatively poor mechanical properties. With a Mooney viscosity higher than 100, the resin composition has poor flowability at the time of molding and hence the resulting molded article has poor appearance.

When the ethylene-propylene-non-conjugated diene copolymer rubber is used as said ethylene-propylene copolymer rubber, dicyclopentadiene, 1,4-hexadiene, dicyclooctadiene, methylnorbornane and 5-ethylidenenorbornane are preferably used as the non-conjugated diene.

The ethylene-propylene copolymer rubber can be produced by conventional methods, for example, by polymerizing the comonomers in the presence of a catalyst composed of vanadium compound and an organoaluminum compound in a hydrocarbon solvent (e.g., hexane, heptane). As the vanadium compound, vanadium oxytrichloride, vadadium tetrachloride or vanadates, and as the organoaluminum compound, ethylaluminium sesquichloride or diethylaluminium chloride may be used.

The titanium catalyst composed of titanium compound and an organoaluminum compound may be also used for producing the ethylene-propylene copolymer rubber of the present invention.

These ethylene-propylene copolymer rubbers may be used as mixtures thereof according to each purpose for obtaining flowability, stiffness, heat resistance, impact strength at low temperature, appearance and adhesion of paint-coated layer of the resin composition and/or its molded article of the present invention.

The amount of the ethylene-propylene copolymer rubber in the polypropylene resin composition used in the present invention is 5 to 40% by weight, preferably 10 to 35% by weight. When said amount is less than 5% by weight, it causes the decreases of the impact strength at low temperature and the adhesion of paint-coated layer of the resulting molded article. When said amount is more than 40% by weight, it causes the decreases of the appearance, especially by generating flow mark, the stiffness and the heat resistance.

(C) The hydroxyl group-containing propylene oligomer:

The hydroxyl group-containing propylene oligomer (C) used in the present invention is an oligomer which comprises a low molecular weight polypropylene having hydroxyl groups. Said polypropylene is preferably selected from homopolypropylene resin, propylene-α-olefin random copolymer resin containing 0.5 to 8% by weight of ethylene or α-olefin having 4 to 6 carbon atoms and the propylene-ethylene block copolymer resin above-mentioned.

An example of said propylene oligomer is a low molecular weight polypropylene to which hydroxyl-containing group is grafted.

Such hydroxyl group-containing propylene oligomer may be prepared by the known methods (e.g., the Japanese Unexamined Patent Publication Nos. Sho 61/113675, Sho 50/160394 and Sho 56/88403).

A preferred hydroxyl group-containing propylene oligomer is one which has a number average molecular weight (Mn) of 2000 to 20000, more preferably 2500 to 15000, and having a hydroxyl value of 10 to 80, more preferably 20 to 60.

Such hydroxyl group-containing propylene oligomers are commercially available, for example, from Sanyo Chemical Industries, Ltd. under a trade name of Youmex 1201H (Y1201H) and Youmex 1210 (Y1210).

The amount of the hydroxyl group-containing propylene oligomer in the polypropylene resin composition used in the present invention is 1 to 15% by weight, preferably 1 to 12% by weight, more preferably 3 to 12% by weight. When said amount is less than 1% by weight, it causes the decreases of the adhesion of paint-coated layer of the resulting molded article. When said amount is more than 15% by weight, it causes the decreases of the impact strength at low temperature.

(D) The inorganic filler:

The inorganic filler (D) used in the present invention includes talc, mica, wollastonite, calcium carbonate, barium sulfate, magnesium carbonate, clay, alumina, silica, calcium sulfate, carbon fiber, glass fiber, metal fiber, silica sand, silica stone, carbon black, titanium oxide, magnesium hydroxide, zeolite, molybdenum, diatomaceous earth, sericite, Shirasu, calcium hydroxide, potassium sulfite, sodium sulfate, bentonite and graphite.

Among these inorganic filler, talc having an average particle diameter of 3 μm or less is desirable in view of its improving effects on the stiffness, impact strength at a low-temperature and appearance of the molded article.

The amount of the inorganic filler in the polypropylene resin composition used in the present invention is 2 to 30% by weight, preferably 2 to 25% by weight. When said amount is less than 2% by weight, it causes the decreases of the stiffness and the heat resistance of the resulting molded article. When said amount is more than 30% by weight, it causes the decreases of the impact strength and the appearance.

(E) The other additives:

The polypropylene resin composition of the present invention may be contained suitable amounts of conventional additives or auxiliaries except for those basic components (A) to (D), as far as the purpose of the present invention is attained.

They include, for example, antioxidant, UV light absorber, slip agent, pigment, antistatic agent, copper deactivator, flame retardant, neutralizing agent, foaming agent, plasticizer, and nucleating agent.

(F) Melt-kneading and Molding:

The polypropylene resin composition of the present invention may be prepared by known methods usually used in the field of the present invention.

For example, the solutions of the above-mentioned components are mixed together and then the solvents are evaporated or precipitate the composition in other solutions.

However, melt-kneading is preferable from the industrial view point. Melt-kneading may be accomplished with a Banbury mixer, single-screw or twin-screw extruder, roll, or kneader at a temperature of 160° to 260° C. for 1 to 20 min.

It is preferable that the mixing of the components is preceded by uniform mixing of each of the components, which may be either powder or pellets, with a tumbler or Henschel mixer. However, this preliminary mixing step may be omitted, and each of the components may directly be fed to a melt-kneading apparatus.

The thus obtained resin composition is then molded by injection molding, extrusion molding and other various molding methods to form molded articles, such as film, sheet, fiber and articles having various shapes. Instead of melt-kneading those components, they may be dry-blended and then mixed during the melting step in the injection molding or extrusion molding to form molded articles.

(G) Surface treating and Paint-coating:

In the present invention, the method for surface treating the polypropylene resin composition molded article is conducted by irradiating said surface with the ultraviolet light.

The light irradiating the surface of the molded article is the ultraviolet light having an irradiation wavelength of 300 nm or less, and in particular an ultraviolet light having an irradiation wavelength of 254 nm and 185 nm as the main active wavelengths, and the intensity thereof is preferably strong.

As a lamp for ultraviolet light irradiation, a low-mercury vapor pressure lamp made by synthetic quartz is preferable.

In the present invention, before irradiating the surface of the polypropylene resin composition molded article with the ultraviolet light, it is not necessary that said surface is treated by a solvent, however, degreasing may be applied to the surface as well known.

As a solvent for degreasing the surface of the polypropylene resin composition molded article, water, an aqueous solution of an alkali and alcohol, such as ethanol and isopropylalcohol, are included.

As a method for contacting the surface of the polypropylene resin composition molded article with the solvent, a method of coating, wiping, dipping or spraying may be employed. Also, a method of power washing an aqueous solution of an acid or an alkali may be employed.

In the present invention, the irradiation time of the ultraviolet light is preferably 20 seconds to 10 min., and more preferably 30 seconds to 5 min.

In the present invention, the method for paint-coating the polypropylene resin composition molded article is conducted by the following; namely, after irradiating the surface of the polypropylene resin composition molded article with the ultraviolet light, said surface of the molded article is paint-coated with a coating material, such as melamine, an urethane and an acrylic coating material.

Preferred examples of the coating material used in the present invention include the melamine coating material and the urethane coating material.

The melamine coating material is preferably a cure type of melamine coating material, and it includes, for example, polyester-melamine coating material, which is elastic and generally used for bumper.

As the urethane coating material, a coating material having an urethane structure, such as acrylic-urethane coating material, polyester-urethane coating material and one-component type of urethane coating material, may be included.

EXAMPLE

The present invention will be described in more detail with reference to the following Examples, which are not intended to restrict the scope of the invention.

Evaluation of Paint-coatability (Initial adhesion)

In the Examples and Comparative Examples, the initial adhesion of paint-coated layer formed on the resin composition molded article was evaluated in the following manner unless otherwise is indicated:

The 100 (10 by 10) squares (each 2 mm by 2 mm) were formed on the paint-coated layer of the specimen by cutting with a razor. A piece of plastic adhesive tape (24 mm in width, cellophane tape manufactured by Nichiban Co., Ltd.) was applied over the squares and rapidly pulled off. By counting the number of squares remaining (the rate of residue: %) on the specimen, the initial adhesion of the paint-coated layer was evaluated.

EXAMPLE 1

The 57 parts by weight of the propylene-ethylene block copolymer resin (A) containing 12% by weight of an ethylene-propylene random copolymer unit (A1) having ethylene/propylene ratio of 28/72 and a crystalline homopropylene polymer unit (A2) having an intrinsic viscosity $[\eta]_P$ of 1.02 dl/g, the Q value (weight average molecular weight $M_W$/number average molecular weight $M_N$ measured by GPC of 3.4 and the content of xylene-soluble portion at 20° C. of 0.9% by weight, 25 parts by weight of the ethylene-propylene copolymer rubber (B) having a propylene content of 27 wt % and a Mooney viscosity measured at 100° C. ($ML_{1+4}$ 100° C.) of 52, 10 parts by weight of the hydroxyl group-containing propylene oligomer (C) having a molecular weight of 4000 and a hydroxyl value of 50 [Youmex (Trade name) 1210 manufactured by Sanyo Chemical Industries, Ltd.] and 8 parts by weight of talc (D) having an average particle diameter of 2 μm were uniformly mixed with a Henschel mixer, and then melt-kneaded at 220° C. by using the continuous twin-screw melt-kneader (TEX 44SS; model 30BW-2V, manufactured by Japan Steel Works, Ltd.) to obtain the pellets of the resin composition of the present invention.

The resulting pellets were injection-molded at 220° C. by using the injection molding machine, "Neomat 515/150" manufactured by Sumitomo Heavy Industries, Ltd., into a flat plate (100×400×3 mm in thickness) for the evaluation of paint-coatability.

The resulting flat plate was placed in front of the ultraviolet light irradiation apparatus equipped with a low-mercury vapor pressure lamp (200 watts) made by synthetic quartz, and the surface treatment was carried out by irradiating the surface of said plate with an ultraviolet light (UV) having wavelengths of 254 nm and 185 nm as the main active wavelengths in an air atmosphere for 60 seconds while keeping the distance between the light source and the surface of the flat plate at about 15 cm.

Then, after spray paint-coating said surface of the flat plate with an acrylic-urethane coating material R271 manufactured by Nippon Bee Chemical Co., Ltd., said paint-coated plate was dried by baking at 90° C. for 30 min., and then initial adhesion of the paint-coated plate was measured.

The results are shown in Table 1.

Comparative Example 1

By following the same procedure as in Example 1, except that the irradiation of the ultraviolet light was not applied, the initial adhesion of the paint-coated plate was measured. The results are shown in Table 1.

Comparative Example 2

By following the same procedure as in Example 1, except that the amount of the crystalline propylene-ethylene block copolymer resin (A) was changed to 67 parts by weight and the hydroxyl group-containing propylene oligomer (C) was not used, the initial adhesion of the paint-coated plate was measured. The results are shown in Table 1.

EXAMPLE 2

By following the same procedure as in Example 1, except that the amounts of the crystalline propylene-ethylene block copolymer resin (A), the ethylene-propylene copolymer rubber (B), the hydroxyl group-containing propylene oligomer (C) and talc (D) were changed to 40 parts by weight, 25 parts by weight, 10 parts by weight and 25 parts by weight, respectively, the initial adhesion of the paint-coated plate was measured. The results are shown in Table 1.

Comparative Example 3

By following the same procedure as in Example 2, except that the irradiation of the ultraviolet light was not applied, the initial adhesion of the paint-coated plate was measured. The results are shown in Table 1.

Comparative Example 4

By following the same procedure as in Example 2, except that the amount of the crystalline propylene-ethylene block copolymer resin (A) was changed to 50 parts by weight and the hydroxyl group-containing propylene oligomer (C) was not used, the initial adhesion of the paint-coated plate was measured. The results are shown in Table 1.

EFFECT OF THE INVENTION

As decribed above, according to the present invention, the methods for surface treating and paint-coating the polypropylene resin composition molded article, which gives excellent paint-coatability and adhesion property of said molded article, and the paint-coated article obtained by said method for paint-coating may be provided. Said paint-coated article is useful and suited especially for automotive exterior parts such as a bumper and an instrument panel.

TABLE 1

|  | Surface treatment Irradiation of UV | Paint-coatability Initial adhesion (%) |
|---|---|---|
| Example 1 | Treated | 100 |
| Comparative Example 1 | None | 0 |
| Comparative Example 2 | Treated | 0 |
| Example 2 | Treated | 100 |
| Comparative Example 3 | None | 0 |
| Comparative Example 4 | Treated | 0 |

What is claimed is:

1. A method for surface treating a polypropylene resin composition molded article, which comprises irradiating a molded article with ultraviolet light having an irradiation wavelength of 300 nm or less, said molded article being obtained from a polypropylene resin composition which comprises:

(A) 15–92% by weight of a crystalline propylene-ethylene block copolymer resin,
(B) 5–40% by weight of an ethylene-propylene copolymer rubber,
(C) 1–15% by weight of a hydroxyl group-containing propylene oligomer, and
(D) 2–30% by weight of an inorganic filler.

2. A method for surface treating a polypropylene resin composition molded article according to claim 1, wherein the crystalline propylene-ethylene block copolymer resin (A) is a propylene-ethylene block copolymer resin containing 5 to 20% by weight of an ethylene-propylene random copolymer unit (A1) having ethylene/propylene ratio of 20/80 to 60/40 and 95 to 80% by weight of a crystalline homopropylene polymer unit (A2) having an intrinsic viscosity $[\eta]_P$ measured with tetralin solution at 135° C. of 0.8 to 2.0 dl/g, the Q value (weight average molecular weight/number average molecular weight) measured by GPC of 3.0 to 5.0 and the content of xylene-soluble portion at 20° C. of 1.5% by weight or less.

3. A method for surface treating a polypropylene resin composition molded article according to claim 1, wherein the ethylene-propylene copolymer rubber (B) is an ethylene-propylene random copolymer rubber which contains 20 to 75% by weight of propylene and which has a Mooney viscosity ($ML_{1+4}$ 100° C.) of 10 to 100.

4. A method for surface treating a polypropylene resin composition molded article according to claim 1, wherein the hydroxyl group-containing propylene oligomer (C) has a number average molecular weight of 2000 to 20000 and a hydroxyl value of 10 to 80.

5. A method for surface treating a polypropylene resin composition molded article according to claim 1, wherein the inorganic filler (D) is a member selected from the group consisting of talc, mica, wollastonite, calcium carbonate, barium sulfate, magnesium carbonate, clay, alumina, silica, calcium sulfate, carbon fiber, glass fiber, metal fiber, silica sand, silica stone, carbon black, titanium oxide, magnesium hydroxide, zeolite, molybdenum, diatomaceous earth, sericite, Shirasu, calcium hydroxide, potassium sulfite, sodium sulfate, bentonite and graphite.

6. A method for surface treating a polypropylene resin composition molded article according to claim 1, wherein the inorganic filler (D) is talc having an average particle diameter of 3 μm or less.

7. A method for paint-coating a polypropylene resin composition molded article, which comprises irradiating a molded article with ultraviolet light having an irradiation wavelength of 300 nm or less and coating the irradiated surface with a paint, said molded article being obtained from a polypropylene resin composition which comprises:

(A) 15–92% by weight of a crystalline propylene-ethylene block copolymer resin,
(B) 5–40% by weight of an ethylene-propylene copolymer rubber,
(C) 1–15% by weight of a hydroxyl group-containing propylene oligomer, and
(D) 2–30% by weight of an inorganic filler.

8. A method for paint-coating a polypropylene resin composition molded article according to claim 7, wherein the crystalline propylene-ethylene block copolymer resin (A) is a propylene-ethylene block copolymer resin containing 5 to 20% by weight of an ethylene-propylene random copolymer unit (A1) having ethylene/propylene ratio of 20/80 to 60/40 and 95 to 80% by weight of a crystalline homopropylene polymer unit (A2) having an intrinsic viscosity $[\eta]_P$ measured with tetralin solution at 135° C. of 0.8 to 2.0 dl/g, the Q value (weight average molecular weight/ number average molecular weight) measured by GPC of 3.0 to 5.0 and the content of xylene-soluble portion at 20° C. of 1.5% by weight or less.

9. A method for paint-coating a polypropylene resin composition molded article according to claim 7, wherein the ethylene-propylene copolymer rubber (B) is an ethylene-propylene random copolymer rubber which contains 20 to 75% by weight of propylene and which has a Mooney viscosity ($ML_{1+4}$ 100° C.) of 10 to 100.

10. A method for paint-coating a polypropylene resin composition molded article according to claim 7, wherein the hydroxyl group-containing propylene oligomer (C) has a number average molecular weight of 2000 to 20000 and a hydroxyl value of 10 to 80.

11. A method for paint-coating a polypropylene resin composition molded article according to claim 7, wherein the inorganic filler (D) is a member selected from the group consisting of talc, mica, wollastonite, calcium carbonate, barium sulfate, magnesium carbonate, clay, alumina, silica, calcium sulfate, carbon fiber, glass fiber, metal fiber, silica sand, silica stone, carbon black, titanium oxide, magnesium hydroxide, zeolite, molybdenum, diatomaceous earth, sericite, Shirasu, calcium hydroxide, potassium sulfite, sodium sulfate, bentonite and graphite.

12. A method for paint-coating a polypropylene resin composition molded article according to claim 7, wherein the inorganic filler (D) is talc having an average particle diameter of 3 μm or less.

13. A method for paint-coating a polypropylene resin composition molded article according to claim 7, wherein the paint is a melamine coating material or an urethane coating material.

14. A paint-coated article obtained by a method for paint-coating a polypropylene resin composition molded article, which comprises irradiating a molded article with ultraviolet light having an irradiation wavelength of 300 nm or less and coating the irradiated surface with a paint, said molded article being obtained from a polypropylene resin composition which comprises:
(A) 15–92% by weight of a crystalline propylene-ethylene block copolymer resin,
(B) 5–40% by weight of an ethylene-propylene copolymer rubber,
(C) 1–15% by weight of a hydroxyl group-containing propylene oligomer, and
(D) 2–30% by weight of an inorganic filler.

15. A paint-coated article according to claim 14, wherein the crystalline propylene-ethylene block copolymer resin (A) is a propylene-ethylene block copolymer resin containing 5 to 20% by weight of an ethylene-propylene random copolymer unit (A1) having ethylene/propylene ratio of 20/80 to 60/40 and 95 to 80% by weight of a crystalline homopropylene polymer unit (A2) having an intrinsic viscosity $[\eta]_P$ measured with tetralin solution at 135° C. of 0.8 to 2.0 dl/g, the Q value (weight average molecular weight/ number average molecular weight) measured by GPC of 3.0 to 5.0 and the content of xylene-soluble portion at 20° C. of 1.5% by weight or less.

16. A paint-coated article according to claim 14, wherein the ethylene-propylene copolymer rubber (B) is an ethylene-propylene random copolymer rubber which contains 20 to 75% by weight of propylene and which has a Mooney viscosity ($ML_{1+4}$ 100° C.) of 10 to 100.

17. A paint-coated article according to claim 14, wherein the hydroxyl group-containing propylene oligomer (C) has a number average molecular weight of 2000 to 20000 and a hydroxyl value of 10 to 80.

18. A paint-coated article according to claim 14, wherein the inorganic filler (D) is a member selected from the group consisting of talc, mica, wollastonite, calcium carbonate, barium sulfate, magnesium carbonate, clay, alumina, silica, calcium sulfate, carbon fiber, glass fiber, metal fiber, silica sand, silica stone, carbon black, titanium oxide, magnesium hydroxide, zeolite, molybdenum, diatomaceous earth, sericite, Shirasu, calcium hydroxide, potassium sulfite, sodium sulfate, bentonite and graphite.

19. A paint-coated article according to claim 14, wherein the inorganic filler (D) is talc having an average particle diameter of 3 μm or less.

20. A paint-coated article according to claim 14, wherein the paint is a melamine coating material or an urethane coating material.

* * * * *